United States Patent Office 2,771,480
Patented Nov. 20, 1956

2,771,480

PURIFICATION OF GLYCERIDE OILS BY MEANS OF ION-EXCHANGE RESINS

Martin G. Chasanov, Newport, Del., Robert Kunin, Trenton, N. J., and Morris Mattikow and Benjamin H. Thurman, New York, N. Y., assignors of one-half to Benjamin Clayton, doing business as Refining, Unincorporated, New York, N. Y., and one-half to Rohm & Haas Company, Philadelphia, Pa., a corporation of Delaware No Drawing. Application July 29, 1953,
Serial No. 371,174

9 Claims. (Cl. 260—420)

This invention relates to, and has for an object, the purification of glyceride oils by means of anion-exchange resins. It relates to, and has for an object, the removal of fatty acids, color-bodies, gums and flavor materials from such oils by adsorption of these impurities on anion-exchange resins. It also relates to, and has for an object, the subsequent removal of the adsorbed impurities from the resins and the restoration of the resins to their original form.

Crude fatty oils contain a large number of impurities, many of which have not even been identified. The impurities which must be removed in order to produce an acceptable refined oil, particularly for edible purposes, may be classified generally as gums, free fatty acids, coloring matter, and flavor materials, the last including the materials which produce the characteristic taste and odor of a given oil. The gums are largely phosphatides and the coloring matter may be largely carotinoid pigments and similar compounds.

Heretofore, most crude fatty oils have been subjected to a process known as alkali refining, that is to say, substantially all of the free fatty acids and gums have been removed from the oil by treating the oil with an aqueous alkali solution followed by separation of the resulting aqueous phase, known as soapstock, from the oil phase, either by settling or by centrifugal separation. The water precipitates the gums and the alkali converts the free fatty acids into soaps. The soaps and precipitated gums separate as part of the soapstock. Such treatment also removes a substantial portion of the flavor materials and, if a caustic alkali is employed as the refining agent, also removes a substantial portion of the coloring matter. Residual coloring matter is usually removed further by a bleaching treatment with adsorbent earths such as fuller's earth and most of the residual flavoring materials can usually be removed by a deodorizing treatment involving steam distillation at elevated temperatures under vacuum conditions.

Various modifications of the above discussed refining process are employed. For example, it is possible to degum the oil prior to alkali refining. That is to say, water may be added to the oil to precipitate the gums and the resulting aqueous phase containing the precipitated gums may be separated from the oil by continuous centrifugal separation. The degummed oil may then be subjected to alkali refining. In the case of crude oils which are initially light in color, the alkali which is employed in the alkali-refining step may be a non-caustic alkali such as soda ash. Such non-caustic alkalis do not attack the neutral oil and consequently refining losses due to saponification of neutral oil are minimized. Even in the case of a highly colored oil, the oil may be first alkali refined with soda ash and then with a caustic alkali with substantial savings over refining with caustic alkali only. Such purification treatments have reached a relatively high degree of perfection but require expensive apparatus and skilled operators.

In accordance with this invention anion-exchange resins having replaceable hydroxyl groups, particularly basic anion-exchange resins containing quaternary ammonium hydroxide groups, are employed to remove the impurities discussed above. By bringing a crude oil in contact with such a resin, preferably by passing the oil through a bed of resin, the gums, free fatty acids, most of the coloring materials and a substantial amount of the flavor materials are adsorbed by the resin and are thus separated from the oil. Very little oil is retained by the resin and any such small amount can be washed therefrom with a solvent for the oil and can be recovered from the resultant solution. No saponification of the oil takes place and since the process can be carried out in a manner which leaves substantially no neutral oil on the resin, there are no losses of oil—merely a clean-cut separation of oil and impurities.

After the resin has adsorbed its full capacity of the fatty acids and other impurities and has become exhausted, it is then regenerated and restored to its original condition so that it can be used for the purification of more oil. The fatty acids are removed readily when the resin is treated with a solution of sodium hydroxide or potassium hydroxide. The caustic alkali may be in an alcoholic solution or in an aqueous solution which also contains a small amount of a synthetic surface-active agent. In many instances—particularly in the case of cottonseed oil—adsorbed color bodies and other impurities are not removed from the resin by the regenerating solution of caustic alkali as are the fatty acids. Consequently, the capacity of the resin may be gradually reduced to the point where the process is no longer efficient. In such cases the exhausted resin is treated with a solution of an oxidizing agent which removes the adsorbed impurities and restores the capacity of the resin.

Oils which have been treated by the process of this invention and have thus been improved in quality include linseed, perilla, soybean, corn, cottonseed, sunflower seed, safflower, and menhaden oils.

Thus the process of this invention accomplishes much the same results as does the conventional treatment with alkali. The instant process, however, is much more easily carried out and it also avoids the formation of emulsions with the attendant loss of oil as occurs in the older process of making alkali-refined oils.

The resins which are employed to best advantage are those anion-exchange resins of the strongly basic type. These constitute a well-recognized class of anion-exchange resins in that they are able to split neutral salts and to adsorb the anions thereof. While the resins may vary as to capacity and density, they are all alike in that they contain quaternary ammonium hydroxide groups as their polar, anion-adsorbing groups and are essentially infusible and insoluble in aqueous solutions of acids, bases and salts as well as in common organic solvents. This kind of resin, which is available commercially, is exemplified by the products of U. S. Patents 2,540,985, 2,591,573 and 2,614,099.

Best results to date have been obtained by the use of a resin made by the process of U. S. Patent 2,591,573 in which a three-dimensional, cross-linked copolymer of a monovinyl hydrocarbon, preferably styrene, and a cross-linking polyvinyl hydrocarbon, preferably divinylbenzene, in the form of small spheroids, is chloromethylated and then aminated by reaction with a tertiary amine, such as trimethylamine or dimethylamino ethanol. Since the porosity of such resins is inversely proportional to the amount of copolymerized cross-linking polyvinyl hydrocarbon and since the more porous or less dense resins have proved to be more efficient and more satisfactory for the purification of glyceride oils, it is recommended that a resin be used which has no more than 4%, and preferably no more than 2% polyvinyl hydrocarbon based on the total weight of copolymerized monovinyl hydrocarbon and polyvinyl hydrocarbon. What is needed for most efficient operation is a resin with very large surface area either by virtue of being very porous or by virtue of being in a finely divided state.

As indicated above, it is preferred to pass the oil to be purified through a bed or column of particles of the anion-exchange resin. The granular or spheroidal particles of the resin should be relatively small in size, preferably of the order of 40 to 60 mesh size in order to insure rapid and complete contact with the oil.

Alternatively the resin can be added to a batch of oil and thereafter removed by filtration, decantation or centrifugal separation. When this method is adopted the particles of resin can be smaller than in the case of column-operation mentioned above. Also, since the particles can be smaller, their density can be somewhat greater in batch-operation.

Although it is possible to refine certain oils by the process of the present invention without reducing their viscosity, most crude fatty oils are relatively viscous materials and percolate rather slowly through a bed of such resin. Such oils can be rendered less viscous by operating at an elevated temperature. Excellent results can usually be obtained by maintaining the oil and resin bed at a temperature between 140° and 180° F.

A preferred operation, however, is to carry out the process at a lower temperature, for example, at usual ambient temperatures, i. e., temperatures ranging from 60° to 100° F., by dissolving the oil in an organic solvent, for example, commercial hexane or petroleum ether to produce a mixture of low viscosity. A combination of elevated temperatures and admixture with a solvent may also be employed to reduce viscosity. Thus, oil-solvent mixtures may be employed from 60° F., for example, up to nearly the boiling point of the solvent. Any solvent for the oil which is inert to both the oil and the resin, and which has a low viscosity and a relatively low boiling point, that is, a solvent which can be distilled from the oil, can be employed. Examples of such solvents are the hexane or petroleum ether mentioned above as well as other aliphatic or aromatic hydrocarbons. Other solvents, having the same general properties as the solvents mentioned above, for example, halogenated hydrocarbons are also suitable. Volatile solvents, i. e., solvents having a boiling point substantially below that of water are preferred so that they may be later vaporized at low temperatures and recovered from the oil. In general, mixtures containing approximately equal parts of oil and solvent by volume are of sufficiently low viscosity but additional amounts of solvent up to several times the volume of the oil may be employed in preparing the miscellae.

The following is presented as an actual and typical example of the method of refining crude oils by the process of this invention:

*Example 1*

A crude cottonseed oil containing 8.17% free fatty acids, 1.51% phosphatides taken to be a measure of the amount of gum, and having the usual dark color of crude oil was mixed with an equal volume of petroleum ether. This oil-solvent mixture was percolated through a column four feet in heighth containing a strongly basic anion-exchange resin known to be the product made by first chloromethylating spheroidal particles of a copolymer of 98% styrene and 2% divinylbenzene and thereafter aminating the chloromethylated material with dimethyl-amino ethanol. After a short initial period the eluate from the column was a light colored solution. After removal of the solvent from the eluate the resultant solvent-free oil was 35Y–5.1R Lovibond color in a 5¼" column. The free fatty acid-content of the oil was 0.04% and the phosphatide-content was 0.00%. The product was, therefore, of the quality of a prime refined cottonseed oil.

Anion exchange resins can also be employed to remove impurities from a partly refined oil. Thus, it is many times advantageous to first degum a crude oil prior to contacting it with an anion-exchange resin. Degumming operations are known to the art and may be accomplished, for example, by mixing water with the oil and continuously centrifugally separating the resulting aqueous phase containing precipitated gums from the oil. Removal of the gums from the oil reduces the load on the anion exchange resin. Also, the gums are among the hardest materials to remove from the exhausted anion exchange resin and their absence in the resin bed makes it easier to wash the impurities therefrom with an alkali solution. It is also possible to refine the oil with a non-saponifying alkali such as soda ash prior to contacting the oil with an anion exchange resin. Such a procedure results in low losses and is primarily useful with high colored oils such as cottonseed oil. The refining, either before or after the degumming of the oil, produces an oil which is substantially free of gums and free fatty acids but which, in the case of highly colored crude oils, still has a dark color. Strongly basic anion exchange resins can thereafter be employed to remove most of the coloring material from the partially refined oil.

The present process can also be employed to remove acidic impurities from oils which originally do not have all of the impurities mentioned above. Thus, certain animal oils or fats are substantially free of gums but contain substantial amounts of free fatty acids and, in some cases, considerable coloring matter. It is apparent, therefore, that the present process is applicable to glyceride oils in general including animal and fish oils as well as vegetable oils.

When it is desired to regenerate the exhausted resin and to remove the adsorbed fatty acids therefrom, the resin is treated with a solution of sodium hydroxide or potassium hydroxide after as much oil as possible has been drained off. The regenerating solution may be an aqueous or an alcoholic solution.

In the case of aqueous solutions, it is most desirable to employ a synthetic surface-active agent in conjunction with the caustic. Conventional and commercially available non-ionic or anionic surface-active agents are recommended, especially the former type typified by phenoxypolyalkoxyalkanols such as p-diisobutylphenoxypoly-ethoxyethanol. If desired the resin may be rinsed free of oil by means of a water-miscible solvent such as ethanol prior to the treatment with the aqueous solution of regenerant. The resin, after treatment is best washed with water until free of alkali and then rinsed with alcohol and the solvent for the oil so that it may be readily wetted by subsequent amounts of oil to be purified.

Ordinarily the regenerating solution contains from about 1% to 5% sodium hydroxide or potassium hydroxide and up to about 1% of the synthetic surface-active agent, although the concentration of the regenerating solution can be beyond these limits if desired. The fatty acids are removed in the form of alkali-metal soaps and while these are soluble to a certain extent, there is always the likelihood that the soaps will form curds. When a fixed column of resin is employed—as is the preferred method of carrying out the process—it is strongly suggested that the aqueous regenerating solution be introduced up-flow into the column so as to "loosen the bed," that is, to separate the particles of resin, so that the curds of soap can rise to the top of the column and be floated away from the resin, after which the bed of resin can be re-settled. By the batch-technique, the resin is merely stirred or shaken in one or more portions of regenerant and then allowed to settle, after which the regenerant solution containing the curds of soap is removed—preferably by decantation.

An alcoholic solution of regenerant is used in much the same way as an aqueous solution but here the problem of removing the oil from the exhausted resin or removing water from the regenerated resin does not exist.

Many oils such as cottonseed oil contain color-bodies which are adsorbed by the strongly basic anion-exchange resin together with the gums and fatty acids. Whereas, however, the gums and fatty acids are removed by the process of regeneration described above the color-bodies are not removed in this way. Consequently, they may continue to be adsorbed and to accumulate to the point where the anion-exchange resin has little, if any, capacity for fatty acids. It is obviously necessary that they be removed and it has been found that they can be removed by treatment of the resins by means of an oxidizing agent such as nitric acid, permanganate salts, chromic acid, sodium hypochlorite, potassium hypochlorite, calcium hypochlorite, and hydrogen peroxide. Some of these oxidizing agents, particularly nitric and chromic acids and the permanganates have a greater destructive action on the resins than do others; and accordingly solutions of the hypochlorites or hydrogen peroxide are very much preferred. Solutions of sodium hypochlorite which are inexpensive and readily available are particularly recommended.

The step of removing the color-bodies by means of oxidizing agents is spoken of as "rejuvenation" in order to distinguish this mode of restoring capacity from the conventional step of regeneration and removal of acids or anions by means of solutions of alkalis.

The step of rejuvenation with oxidizing agents can be carried out before or after the regeneration with caustic alkali described above; but in general it is preferred to remove the color-bodies et cetera prior to the removal of the fatty acids. In either case, the resin is treated with a solution of the oxidizing agent until it is apparent that the color-bodies are removed. Usually the progress of the rejuvenation can be followed by an observation of the change in color of the resin from a dark color to its original color. Also the color of the solution of oxidizing agent becomes darker as it removes the color-bodies. It has been found to be unnecessary to wash the oil from the exhausted resin if the solution of oxidizing agent is used ahead of the caustic regenerant and this is one real reason for performing the rejuvenation step first.

Relatively dilute solutions, of the order of 1–10%, of the oxidizing agents are employed. Obviously more highly diluted solutions of the more vigorous oxidizing agents, such as chromic acid, nitric acid and permanganate solutions should be used in order to minimize their destructive action on the resin. Since the hypochlorites and hydrogen peroxide are so much less destructive and since they are nevertheless excellent chemicals for the removal of color-bodies, it is recommended that they be employed in preference to the others.

The following examples are given for the purpose of illustrating how oils can be improved in quality by means of anion-exchange resins and how the resins can be rejuvenated by removal of adsorbed color-bodies and can also be regenerated by removal of adsorbed fatty acids.

*Example 2*

Two samples of cottonseed oil were obtained in the open market. One sample (A) contained 7.3% free fatty acids, was dark brown, and had a Lovibond color of 35 yellow–10.4 red, while the other sample (B) contained 0.9% free fatty acids, was orange and had a Lovibond color of 35 yellow–4.6 red. (Lovibond colors refers to the official cup tests of the A. O. C. S.)

These oils were diluted with an equal volume of hexane and the resultant miscellae were passed through individual columns, one inch in diameter, containing a 200 ml. bed of spheroidal particles of a strongly basic quaternary ammonium anion-exchange resin in the hydroxyl form. The resin was known to have been made according to the process of U. S. Patent 2,591,573 by first chloromethylating an insoluble copolymer of 98% styrene and 2% divinylbenzene in the form of spheroids or beads and then aminating the chloromethylated resin with dimethylamino ethanol. A total of 600 ml. of each miscella was passed down-flow through a bed of resin at the rate of approximately .02 of the bed volume per minute. At the end of this time the amount of free fatty acids in effluent of sample A was .02% and in effluent of sample B was .01% as determined by the process found in Jamieson's "Vegetable Fats and Oils" (Reinhold Publishing Corporation, New York, N. Y., 1943, page 437). At the same time, most of the color was also removed. Sample A had become a pale yellow while Sample B had become an extremely pale yellow. The beds of resin, particularly the one through which Sample A had passed, were very much darker in color. In fact the bed which had been used in the treatment of Sample A was black.

The resin in each column was allowed to drain and was then regenerated and rejuvenated as follows (even though the bed from Sample A contained a greater quantity of fatty acids and color-bodies): A total of 400 ml. of a 5% aqueous solution of sodium hypochlorite was slowly passed through each bed over a period of thirty minutes. During this time each resin was restored to its original yellow color. Next a total of 600 ml. of a 4% aqueous solution of sodium hydroxide containing 0.5% of a non-ionic surface-active agent (p-diisobutylphenoxypolyethoxy ethanol) was slowly passed up-flow while each bed of resin was kept in a loosened condition by means of a stream of air admitted at the bottom of the columns. Curds of soap which formed were thus carried up and out of the columns. Next the remaining alkali was washed from the beds with water. The beds of resin were allowed to settle and were rinsed downflow first with 200 ml. of ethanol and then with 200 ml. of hexane.

The cycle described above of first passing cottonseed oil through the beds of resin with adsorption of the color-bodies and fatty acids and then regenerating and rejuvenating the resin was repeated several times with essentially the same results. In every cycle an oil of much improved quality was obtained.

Also essentially the same results were obtained when a 3% aqueous solution of hydrogen peroxide containing 1% sodium hydroxide was substituted for the sodium hypochlorite used above.

*Example 3*

Four volumes of raw linseed oil containing 1.8% free fatty acids and having the characteristic brown color was mixed with one volume of the quaternary ammonium anion-exchange resin described in Example 2. The mixture was agitated vigorously at room temperature for three hours. At the end of this time, the resin and oil were separated. The oil was found to have a fatty acid-content of 0.1%; and it was determined that 40% of the color had also been removed. The resin was rejuvenated by stirring it in two volumes of a 3% aqueous solution of sodium hypochlorite for 20 minutes, during which time the resin regained its original yellowish color. After removal of the resin, the solution of hypochlorite was evaporated to dryness and deposited a black residue. The rejuvenated resin was next regenerated by being agitated in three volumes of a 4% aqueous solution of sodium hydroxide containing 0.5% of the same non-ionic surface-active agent employed in Example 2, after which the resin was washed thoroughly with water, then with 2 volumes each of alcohol and hexane in that order. The above cycle of treating more linseed oil with the resin followed by rejuvenation and regeneration was repeated several times with essentially the same results; that is, with removal of almost all of the fatty acids and a large part of the color-bodies.

By the same method of batch operation, six volumes of dehydrated castor oil was treated with one volume of the same resin for four hours. The amount of free fatty acids in the oil was reduced from 4.1% to less than 0.6%. Since the original oil was very pale in color indicating a substanital absence of color-bodies, the step of rejuvenation was omitted and only the step of regeneration (carried out as with linseed oil) was necessary to restore the resin to its original form.

Also by the same process, five volumes of corn oil, with a fatty acid-content of 2% and an orange-yellow color, was treated batch-wise for four hours with one volume of the strongly basic anion-exchange resin described above. At the end of this time, the separated oil had an acid-content of only 0.2% and it was very much paler in color. The separated resin, in this instance, was rejuvenated with four volumes of a 3% aqueous solution of hydrogen peroxide, was next regenerated with four volumes of a 4% sodium hydroxide solution containing 0.5% of a non-ionic surface-active agent and finally washed as above described with water, alcohol and hexane. The cycle of adsorption and regeneration was repeated several times with, in each case, the production of a much refined oil.

Essentially the same process was employed in reducing the fatty acid-content of coffee oil from 3.8% to less than 1%. Also the amount of free fatty acid in Norwegian cod oil was reduced from 27.6% to about 15% when five volumes of the oil was slowly percolated through one volume of the same resin. Some of the color-bodies were removed from these oils at the same time and the resins were rejuvenated and regenerated with a 3% aqueous solution of hydrogen peroxide and a 4% aqueous solution of sodium hydroxide.

We claim:

1. The process of refining a glyceride oil containing free fatty acids and color-bodies which comprises bringing said oil in contact with particles of a strongly basic anion-exchange resin containing quaternary ammonium hydroxide groups, adsorbing said fatty acids and said color-bodies on said resin, separating the oil and resin, removing adsorbed color-bodies from said resin by treating the resin with a solution of an oxidizing agent which is a member of the class consisting of aqueous solutions of inorganic hypochlorites and of hydrogen peroxide and removing said adsorbed fatty acids from said resin by treating the resin with a solution of a caustic alkali.

2. The process of claim 1 in which said solution of caustic alkali is a member of the class consisting of alcoholic solutions and aqueous solutions containing a dissolved surface-active agent.

3. The process of claim 1 in which the treatment of the resin with the solution of oxidizing agent precedes the treatment of the resin with the solution of the caustic alkali.

4. The process of claim 1 in which the glyceride oil is cottonseed oil.

5. The process of claim 1 in which the glyceride oil is linseed oil.

6. The process of claim 1 in which the glyceride oil is soybean oil.

7. The process of claim 1 in which the glyceride oil is corn oil.

8. The process of claim 1 in which the glyceride oil is passed through a bed of particles of said resin.

9. The process of claim 8 in which the glyceride oil is dissolved in an organic solvent.

References Cited in the file of this patent

UNITED STATES PATENTS

| | | |
|---|---|---|
| 2,225,575 | Thurman | Dec. 17, 1940 |
| 2,456,428 | Parker | Dec. 14, 1948 |
| 2,639,289 | Vogel | May 19, 1953 |
| 2,683,695 | Dwyer et al. | July 13, 1954 |

OTHER REFERENCES

Machod: Ion Exchange, 1949, pages 130, 317 and 318.
Amberlites, Rohm and Haas Ion Exchange Report #1 and #4. (Received in Patent Office April 23, 1951.)